(12) United States Patent
Hino et al.

(10) Patent No.: US 10,330,923 B2
(45) Date of Patent: Jun. 25, 2019

(54) MEMBER FOR OPTICAL SCANNER, OPTICAL SCANNER, METHOD OF MANUFACTURING OPTICAL SCANNER, IMAGE DISPLAY DEVICE, AND HEAD-MOUNTED DISPLAY

(71) Applicant: Seiko Epson Corporation, Tokyo (JP)

(72) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 136 days.

(21) Appl. No.: 15/472,768

(22) Filed: Mar. 29, 2017

(65) Prior Publication Data
US 2017/0285333 A1    Oct. 5, 2017

(30) Foreign Application Priority Data
Mar. 30, 2016  (JP) .................................. 2016-067515

(51) Int. Cl.
| | | |
|---|---|---|
| *G02B 26/10* | (2006.01) | |
| *G02B 27/01* | (2006.01) | |
| *G02B 26/08* | (2006.01) | |

(52) U.S. Cl.
CPC ......... *G02B 26/101* (2013.01); *G02B 26/085* (2013.01); *G02B 26/105* (2013.01); *G02B 27/0101* (2013.01); *G02B 27/0172* (2013.01); *G02B 2027/0178* (2013.01)

(58) Field of Classification Search
CPC .............. G02B 26/101; G02B 27/0172; G02B 27/0101; G02B 26/105; G02B 2027/0178
USPC ................................ 359/199.3, 200.7, 221.2
See application file for complete search history.

(56) References Cited

U.S. PATENT DOCUMENTS

| | | | |
|---|---|---|---|
| 5,912,608 A | 6/1999 | Asada | |
| 10,103,613 B2* | 10/2018 | Sadaharu | ............... H02K 33/18 |
| 2005/0157236 A1* | 7/2005 | Kawasaki | ............. G02F 1/1362 349/139 |
| 2008/0180771 A1 | 7/2008 | Watanabe et al. | |
| 2012/0120616 A1* | 5/2012 | Katsui | ............... G02F 1/136286 361/748 |
| 2015/0253568 A1* | 9/2015 | Kobayashi | ............ B81B 7/0083 359/199.2 |
| 2016/0170200 A1* | 6/2016 | Takimoto | ............. G02B 26/085 359/221.2 |

FOREIGN PATENT DOCUMENTS

| | | |
|---|---|---|
| JP | 08-322227 A | 12/1996 |
| JP | 2000-132803 A | 5/2000 |
| JP | 2003-037011 A | 2/2003 |
| JP | 2008-170565 A | 7/2008 |

* cited by examiner

*Primary Examiner* — Frank G Font
(74) *Attorney, Agent, or Firm* — Harness, Dickey & Pierce, P.L.C.

(57) ABSTRACT

A member for an optical scanner includes: a functional portion including a movable portion, a shaft portion oscillatably supporting the movable portion, and a support portion supporting the shaft portion; a wiring line provided on the movable portion; and a structure provided on the functional portion and thicker than the wiring line; the wiring line and the structure are provided on a first major surface of the functional portion.

9 Claims, 9 Drawing Sheets

MEMBER FOR OPTICAL SCANNER, OPTICAL SCANNER, METHOD OF MANUFACTURING OPTICAL SCANNER, IMAGE DISPLAY DEVICE, AND HEAD-MOUNTED DISPLAY

BACKGROUND

1. Technical Field

The present invention relates to a member for an optical scanner, an optical scanner, a method of manufacturing an optical scanner, an image display device, and a head-mounted display.

2. Related Art

As one of optical scanning means used in projectors or head-mounted displays, an optical scanners is known (e.g., see JP-A-2008-170565).

An oscillator device disclosed in JP-A-2008-170565 includes a movable plate, a beam, and a support substrate. The support substrate supports the movable plate through the beam, and the movable plate freely vibrates. On a first surface of the movable plate, a light reflective surface for reflecting light is provided. The light reflected on the light reflective surface can be deflected by two-dimensionally vibrating the movable plate with the oscillator device.

Moreover, a sensor that measures a desired detection physical quantity is disposed in a portion on the first surface of the movable plate and the beam. The physical quantity detected by the sensor is converted into an electric signal, which can be detected from a detecting electrode pad through a wiring line.

In the oscillator device performing light deflection as disclosed in JP-A-2008-170565, a light reflective portion is formed by depositing a metal film on the first surface of the movable plate in many cases. The metal film is deposited by a vapor phase deposition method such as sputtering or evaporation. In the vapor phase deposition method, since the film is deposited selectively in a targeted area, the deposition area is defined using a mask.

However, when the mask is disposed on the first surface, the mask may come in contact with the wiring line and adversely affect the wiring line.

SUMMARY

An advantage of some aspects of the invention is to provide a member for an optical scanner capable of inhibiting contact between a wiring line and a mask that defines a deposition area when subjected to deposition for forming a light reflective portion, an optical scanner including the member for an optical scanner, a method of manufacturing the optical scanner, and an image display device and a head-mounted display both including the optical scanner.

The advantage is achieved by the following aspects of the invention.

A member for an optical scanner according to an aspect of the invention includes: a functional portion including a movable portion and a support portion oscillatably supporting the movable portion; a wiring line provided on the movable portion; and a structure provided on the functional portion and thicker than the wiring line; the wiring line and the structure are provided on a first major surface of the functional portion.

According to the member for an optical scanner, the structure thicker than the wiring line is provided. Therefore, the contact between the mask that defines the deposition area and the wiring line can be inhibited when the member for an optical scanner is subjected to deposition to form the light reflective portion on the first major surface of the movable portion.

In the member for an optical scanner according to the aspect of the invention, it is preferable that the structure is provided on the movable portion.

With this configuration, a distance between the structure and the wiring line can be reduced. Therefore, even if the mask sags for example, the probability of the mask coming in contact with the wiring line can be reduced.

In the member for an optical scanner according to the aspect of the invention, it is preferable that the structure is provided on the support portion.

With this configuration, a number of structures or a larger structure can be provided. Therefore, it is possible to increase the number of contact points between the mask and the structure, or widen the contact area. As a result, the mask can be held more stably, and the light reflective portion can be deposited with higher precision.

In the member for an optical scanner according to the aspect of the invention, it is preferable that the wiring line is a coil.

With this configuration, a driving force for oscillating the movable portion can be generated by sending a current through the wiring line.

In the member for an optical scanner according to the aspect of the invention, it is preferable that a constituent material of the structure is a metal material or a resin material.

When the resin material is used, the structure can be relatively easily formed, and thus a cost reduction is achieved; while when the metal material is used, the structure with high rigidity can be formed, and thus the structure that is less likely to be broken even when coming in contact with the mask is obtained.

In the member for an optical scanner according to the aspect of the invention, it is preferable that when the wiring line is defined as a first wiring line, the structure is a second wiring line different from the first wiring line.

With this configuration, the second wiring line has both the function of a conducting path and the function of the structure. Therefore, there is no need to provide a structure that has only the function of the structure, and the space on the first major surface of the movable portion can be effectively used.

In the member for an optical scanner according to the aspect of the invention, it is preferable that the first wiring line and the second wiring line are electrically connected.

With this configuration, the second wiring line can be formed simultaneously with the first wiring line, so that manufacturing efficiency of the member for an optical scanner can be further enhanced.

An optical scanner according to another aspect of the invention includes: the member for an optical scanner according to the aspect of the invention; and a light reflective portion provided on the first major surface of the movable portion.

With this configuration, an adverse effect on the wiring line can be prevented in forming the light reflective portion. Therefore, the occurrence of troubles, such as a break in the wiring line or an increase in the electrical resistance thereof, can be prevented. As a result, an optical scanner with high reliability is obtained.

A method of manufacturing an optical scanner according to still another aspect of the invention includes: disposing a mask in a position in contact with the structure of the member for an optical scanner according to the aspect of the invention; and supplying a deposition material onto the first major surface of the movable portion through the mask to form a light reflective portion.

With this configuration, an optical scanner with high reliability can be efficiently manufactured.

An image display device according to yet another aspect of the invention includes the optical scanner according to the aspect of the invention.

With this configuration, an image display device with high reliability can be provided.

A head-mounted display according to still yet another aspect of the invention includes the optical scanner according to the aspect of the invention.

With this configuration, a head-mounted display with high reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of a member for an optical scanner, an optical scanner, a method of manufacturing an optical scanner, an image display device, and a head-mounted display will be described with reference to the accompanying drawings.

1. Optical Scanner

First, an embodiment of an optical scanner and an embodiment of a member for an optical scanner included in the optical scanner will be described.

Figure 1:
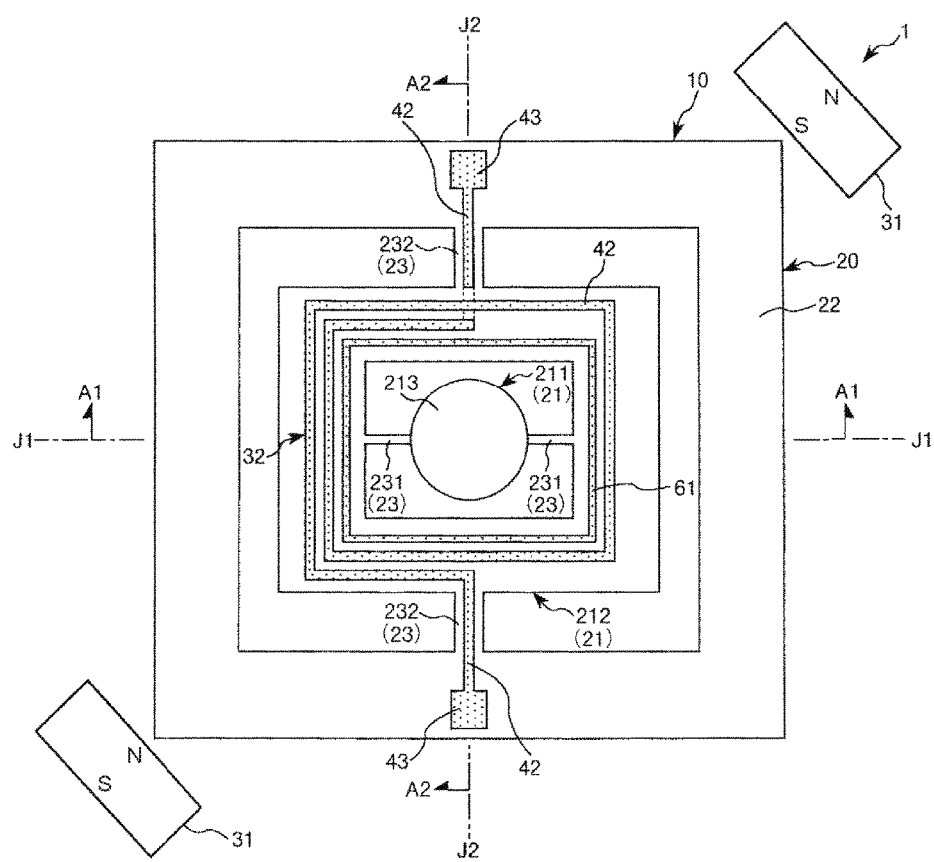
FIG. 1 is a plan view (top view) showing an optical scanner and a member for an optical scanner according to an embodiment.
Figure 2:
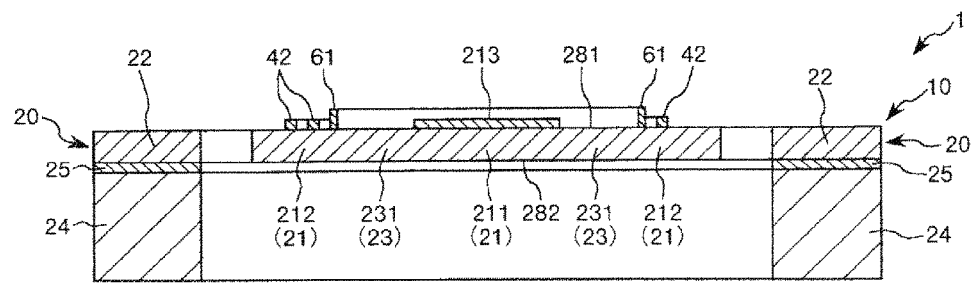
FIG. 2 is a cross-sectional view taken along the line A1-A1 in FIG. 1.
Figure 3:
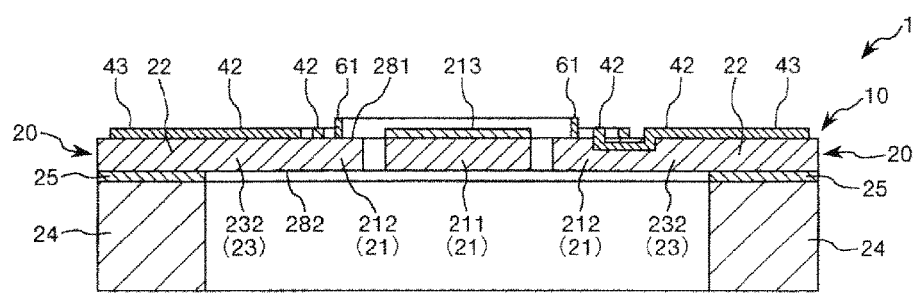
FIG. 3 is a cross-sectional view taken along the line A2-A2 in FIG. 1.

FIG. 1 is a plan view (top view) showing an optical scanner and a member for an optical scanner according to an embodiment. FIG. 2 is a cross-sectional view taken along the line A1-A1 in FIG. 1. FIG. 3 is a cross-sectional view taken along the line A2-A2 in FIG. 1. In the specification, for convenience of description, the upper side in FIGS. 2 and 3 is referred to as "top" or "upper", and the lower side is referred to as "bottom" or "lower".

The optical scanner 1 (optical scanner according to the embodiment) shown in FIG. 3 includes the member 10 for an optical scanner (member for an optical scanner according to the embodiment) and a light reflective portion 213 provided on a first major surface 281 of the member 10 for an optical scanner. Further, the optical scanner 1 includes two permanent magnets 31 shown in FIG. 1. That is, the member 10 for an optical scanner corresponds to a portion of the optical scanner 1 excluding the light reflective portion 213 and the permanent magnets 31, and is a member used for manufacturing the optical scanner 1.

The member 10 for an optical scanner includes a functional portion 20 including a movable portion 21, a shaft portion 23 that oscillatably supports the movable portion 21, and a support portion 22 that supports the shaft portion 23. That is, the support portion 22 oscillatably supports the movable portion 21 through the shaft portion 23. Moreover, when two major surfaces of the functional portion 20 in opposing relationship to each other are defined as the first major surface 281 (upper surface in FIG. 2) and a second major surface 282 (lower surface in FIG. 2), the member 10 for an optical scanner includes a wiring line 42 provided on the first major surface 281 of the movable portion 21. Further, the member 10 for an optical scanner includes a structure 61 that is provided on the first major surface 281 of the functional portion 20 and thicker than the wiring line 42.

The member 10 for an optical scanner is provided with the structure 61 thicker than the wiring line 42; therefore, when the member 10 for an optical scanner is subjected to deposition to form the light reflective portion 213 on the first major surface 281 of the movable portion 21, contact between a mask that defines the deposition area and the wiring line 42 can be prevented. That is, when it is intended to move the mask close to the first major surface 281, the mask comes in contact with the structure 61 before coming in contact with the wiring line 42 and cannot move further closer. Therefore, the contact between the mask and the wiring line 42 is prevented, so that an adverse effect on the wiring line 42 caused by the contact can be prevented.

In addition, since using the member 10 for an optical scanner makes it possible to prevent an adverse effect on the wiring line 42 in forming the light reflective portion 213, the occurrence of troubles, such as a break in the wiring line 42 or an increase in the electrical resistance thereof, can be prevented. As a result, the optical scanner 1 with high reliability is obtained.

Hereinafter, the portions of the optical scanner 1 and the member 10 for an optical scanner will be successively described.

As shown in FIG. 1, the optical scanner 1 includes the movable portion 21 oscillatable about oscillation axes J1 and J2 orthogonal to each other. The movable portion 21 supports the light reflective portion 213. The optical scanner 1 reflects light with the light reflective portion 213 while oscillating the light reflective portion 213, thereby performing two-dimensional scanning with the light. In the embodiment, the oscillation axis J1 is an axis about which the light reflective portion 213 oscillates in the horizontal direction, while the oscillation axis J2 is an axis about which the light reflective portion 213 oscillates in the vertical direction.

The movable portion 21 according to the embodiment includes a first movable portion 211 and a second movable portion 212. The light reflective portion 213 is provided on the first major surface 281 of the first movable portion 211.

The first movable portion 211 is a portion of the functional portion 20 and has a plate shape. The shape of the first movable portion 211 in a plan view of the first major surface 281 is not particularly limited, but is a circle in the embodiment. Examples of the shape include, for example, an ellipse, an oval, and a polygon in addition to a circle.

The light reflective portion 213 is formed of, for example, a metal film of aluminum or the like. In the embodiment, the light reflective portion 213 is circular in the plan view. The plan-view shape of the light reflective portion 213 is not limited to this and may be, for example, an ellipse, an oval, a polygon, or the like.

The second movable portion 212 is a portion of the functional portion 20 and has a plate shape. The shape of the second movable portion 212 in the plan view of the first major surface 281 is not particularly limited, but the second movable portion 212 has a shape surrounding the first movable portion 211 in the embodiment. That is, the first movable portion 211 is disposed inside the second movable portion 212 in the plan view. Examples of the shape surrounding the first movable portion 211 may include, for example, a circular ring shape, an ellipsoidal ring shape, and an oval ring shape in addition to the rectangular ring shape shown in FIG. 1.

According to the shape described above, even when the oscillation axis J1 and the oscillation axis J2 are both set to axes of symmetry, the plan-view shape of the movable portion 21 easily satisfies a line symmetrical relationship. With this configuration, even when the movable portion 21 has two oscillation axes, the movable portion 21 exhibits more excellent drive stability.

The shaft portion 23 according to the embodiment is a portion of the functional portion 20, and includes first shaft portions 231 and 231 that oscillatably support the first movable portion 211 about the oscillation axis J1 and second shaft portions 232 and 232 that oscillatably support the first movable portion 211 and the second movable portion 212 about the oscillation axis J2.

The first shaft portions 231 and 231 are disposed on opposite sides of the first movable portion 211 so as to support the first movable portion 211 from both sides. Each of the first shaft portions 231 and 231 is formed of a beam extending along the oscillation axis J1. One end of the beam is connected to the first movable portion 211, while the other end is connected to the second movable portion 212. The first shaft portions 231 and 231 oscillatably support the first movable portion 211 about the oscillation axis J1, and are torsionally deformed by oscillation of the first movable portion 211 about the oscillation axis J1. The shape of the first shaft portions 231 and 231 is not limited to the shape of the embodiment as long as the first shaft portions 231 and 231 can oscillatably support the first movable portion 211 about the oscillation axis J1. For example, each of the first shaft portions 231 and 231 may be formed of a plurality of beams, or may include, at at least one midpoint, a bent or curved portion, a branched portion, or a different width portion.

The second shaft portions 232 and 232 are disposed on opposite sides of the second movable portion 212 so as to support the second movable portion 212 from both sides. Each of the second shaft portions 232 and 232 is formed of a beam extending along the oscillation axis J2. One end of the beam is connected to the second movable portion 212, while the other end is connected to the support portion 22. The second shaft portions 232 and 232 oscillatably support the movable portion 21 about the oscillation axis J2, and are torsionally deformed by oscillation of the movable portion 21 about the oscillation axis J2. The shape of the second shaft portions 232 and 232 is not limited to the shape of the embodiment as long as the second shaft portions 232 and 232 can oscillatably support the movable portion 21 about the oscillation axis J2. For example, each of the second shaft portions 232 and 232 may be formed of a plurality of beams, or may include, at at least one midpoint, a bent or curved portion, a branched portion, or a different width portion.

The support portion 22 has a frame shape and is disposed so as to surround the movable portion 21 in the plan view of the first major surface 281. The support portion 22 is connected with the shaft portion 23 and supports the shaft portion 23. The support portion 22 is placed on a base (not shown) through a connection layer 25 and a base portion 24 both of which will be described later. The shape of the support portion 22 is not particularly limited as long as the support portion 22 can support the shaft portion 23. For example, the support portion 22 may be divided into two portions: one is a portion that supports one of the second shaft portions 232; and the other is a portion that supports the other second shaft portion 232.

As described above, the base portion 24 is provided on the second major surface 282 of the support portion 22 through the connection layer 25. The base portion 24 has the function of a reinforcing portion that reinforces a mechanical strength of the support portion 22.

The connection layer 25 is provided between the support portion 22 and the base portion 24. In the embodiment, the connection layer 25 has a shape coincident with the base portion 24 in the plan view.

Two electrode pads 43 are provided on the first major surface 281 of the support portion 22. The wiring line 42 is laid so as to electrically connect the electrode pads 43 together. The wiring line 42 is laid along the first major surface 281 of the functional portion 20. Specifically, the wiring line 42 is laid so as to successively run on the respective first major surfaces 281 of the support portion 22, the second shaft portion 232, the second movable portion 212, the second shaft portion 232, and the support portion 22.

In the second movable portion 212, the wiring line 42 is also laid in a ring shape along the ring shape of the second movable portion 212 in the plan view. Specifically, the wiring line 42 shown in FIG. 1 makes one and a half turns along the circumferential direction of the second movable portion 212. The wiring lines 42 are spaced apart from each other and thus insulated from each other. With this configuration, the wiring line 42 laid on the second movable portion 212 forms a coil 32 (is a coil 32). Hence, by applying a voltage between the electrode pads 43 to send a current through the wiring line 42, a magnetic field can be generated around the coil 32 formed of the wiring line 42. With interaction between the magnetic field generated from the coil 32 and a magnetic field generated from the two permanent magnets 31 and 31 shown in FIG. 1, a driving force for oscillating the movable portion 21 can be generated.

The number of turns of the wiring line 42 in the coil 32 is not particularly limited, but is preferably one or more and 100 or less and more preferably three or more and 50 or less. The coil 32 whose number of turns falls within the range can generate a magnetic field with an intensity necessary and sufficient to drive the light reflective portion 213.

The thickness of the wiring line 42 is not particularly limited, but is preferably 0.1 µm or more and 20 µm or less, more preferably 1 µm or more and 15 µm or less, and further preferably 5 µm or more and 10 µm or less.

In the embodiment, when the wiring lines 42 cross each other in a plan view, one of the wiring lines 42 is laid within the second movable portion 212. With this configuration, a portion of the second movable portion 212 is interposed between the one wiring line 42 and the other wiring line 42 crossing each other, so that the wiring lines can cross each other while being insulated from each other.

The form of the crossing portion is not limited to that described above, and the wiring lines may cross each other such that one of the wiring lines 42 is provided in a flying manner using, for example, a bonding wire.

As described above, the structure 61 thicker than the wiring line 42 is provided on the first major surface 281 of the second movable portion 212. The member 10 for an optical scanner including the structure 61 saves, in forming the light reflective portion 213 on the first major surface 281 of the first movable portion 211 by various kinds of deposition methods, the wiring line 42 from the mask defining the deposition area, and prevents the contact between the wiring line and the mask. That is, even when the mask is moved closer until the mask comes in contact with the structure 61, the contact between the mask and the wiring line 42 can be prevented. As a result, an adverse effect on the wiring line 42 due to the contact can be prevented, and the occurrence of troubles, such as a break in the wiring line 42 or an increase in the electrical resistance thereof, can be prevented.

In FIG. 1, the wiring line 42 and the structure 61 are shown with dots for clarity of illustration. The structure 61 will be described in detail later.

The optical scanner 1 may include a piezoresistive element (not shown) provided in, for example, the vicinity of a boundary portion between the first shaft portions 231 and 231 and the support portion 22. By providing the piezoresistive element, the behavior of the first movable portion 211 (the light reflective portion 213) can be electrically detected. The piezoresistive element may be provided at other places.

A wiring line (not shown) is connected to the piezoresistive element. The wiring line is laid on, for example, the first major surfaces 281 of the second movable portion 212, the second shaft portion 232, and the support portion 22, and the wiring line is preferably thinner than the structure 61 similarly to the wiring line 42 described above. With this configuration, a break in the wiring line or an increase in the electrical resistance thereof can be prevented.

The wiring line connected to the piezoresistive element may be provided instead of the wiring line 42. That is, although the wiring line 42 forming the coil 32 is thinner than the structure 61 in the embodiment, an embodiment of the invention is not limited to this. The invention may employ a form in which the wiring line connected to the piezoresistive element is provided instead of the wiring line 42 forming the coil 32 and the wiring line connected to the piezoresistive element is thinner than the structure 61. Such a form also provides the advantageous effects described above. In this case, a magnet, instead of the coil 32, is bonded to the second movable portion 212, and thus a driving force for driving the movable portion 21 can be obtained.

The two permanent magnets 31 and 31 placed on the base (not shown) are provided outside the support portion 22. The permanent magnets 31 become magnetized in oblique directions with respect to the oscillation axis J1 and the oscillation axis J2 in the plan view. The permanent magnets 31 are disposed such that the N-pole of one of the permanent magnets 31 and the S-pole of the other permanent magnet 31 are opposite to each other. The permanent magnets 31 and the coil 32 described above constitute a drive unit that drives the movable portion 21.

That is, the drive unit includes the permanent magnets 31 and the coil 32, and rotatably drives the movable portion 21 described above by an electromagnetic drive method (more specifically, a moving coil-type electromagnetic drive method). The electromagnetic drive method can generate a large driving force. Therefore, the drive unit employing the electromagnetic drive method can increase the swing angle of the movable portion 21 while lowering a drive voltage.

The permanent magnet 31 is not particularly limited, and for example, a magnetized hard magnetic substance, such as a neodymium magnet, a ferrite magnet, a samarium-cobalt magnet, an alnico magnet, or a bonded magnet, can be favorably used.

The coil 32 is electrically connected to a power supply (not shown). To the coil 32, a superimposed voltage including a first alternating voltage and a second alternating voltage superimposed on each other is applied. The first alternating voltage causes the first movable portion 211 to oscillate about the oscillation axis J1, and the second alternating voltage causes the second movable portion 212 together with the first movable portion 211 to oscillate about the oscillation axis J2. With this configuration, the first movable portion 211 oscillates about the oscillation axis J1 while the second movable portion 212 oscillates about the oscillation axis J2; as a result, the first movable portion 211 oscillates about the oscillation axes J1 and J2. It is preferable that the oscillation of the first movable portion 211 about the oscillation axis J1 is resonantly driven, and that the oscillation of the second movable portion 212 about the oscillation axis J2 is non-resonantly driven. As the waveform of the first alternating voltage, a sine wave of approximately 10 kHz or more and 40 kHz or less is preferably used. As the waveform of the second alternating voltage, a sawtooth wave of approximately 30 Hz or more and 120 Hz or less (approximately 60 Hz) is preferably used. With this configuration, the oscillation of the light reflective portion 213 is a movement suitable for drawing an image.

2. Method of Manufacturing Optical Scanner

Hereinafter, a method of manufacturing an optical scanner will be described using, by way of example, the manufacture of the optical scanner 1 described above.

Figure 4:
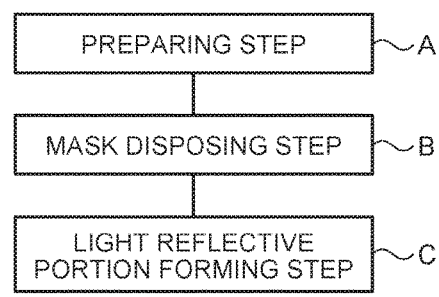
FIG. 4 is a flow sheet for explaining a method of manufacturing the optical scanner shown in FIG. 2.

FIG. 4 is a flow sheet for explaining the method of manufacturing the optical scanner shown in FIG. 2. FIGS. 5 to 9 are cross-sectional views for explaining the method of manufacturing the optical scanner shown in FIG. 2.

The method of manufacturing the optical scanner 1 shown in FIG. 4 includes: a preparing step A of preparing the member 10 for an optical scanner; a mask disposing step B of disposing a mask 5 in a position in contact with the structure 61 of the member 10 for an optical scanner; and a light reflective portion forming step C of supplying a deposition material m onto the first major surface 281 of the movable portion 21 through the mask 5 to form the light reflective portion 213. According to the manufacturing method, the optical scanner 1 with high reliability described above can be efficiently manufactured.

The steps will be successively described below.

[A] Preparing Step A

First, as the step of preparing the member 10 for an optical scanner, one example of a method of manufacturing the member 10 for an optical scanner will be described. The manufacturing method below is illustrative only, and the invention is not limited to this example.

[A-1] Substrate Preparing Step

First, a substrate 24A for forming the base portion 24 is prepared. The substrate 24A is, for example, a silicon substrate. The thickness of the substrate 24A is not particularly limited, and is, for example, 100 µm or more and 200 µm or less.

A first layer 25A for forming the connection layer 25 is formed on the substrate 24A, and further, a second layer 20A for forming the functional portion 20 is formed on the first layer 25A.

The first layer 25A is made of, for example, silicon such as polysilicon or single-crystal silicon. Examples of a method of forming the first layer 25A include, for example, a method of forming a polysilicon layer by a deposition method such as a CVD method, and a method of forming a single-crystal silicon layer using a deposition method such as an epitaxial growth method. Thereafter, planarization is performed as necessary by etch-back, chemical mechanical polishing (CMP), or the like. The thickness of the first layer 25A is not particularly limited, and is, for example, 5 µm or more and 40 µm or less.

A portion of the first layer 25A may be replaced as necessary with a sacrificial layer. The sacrificial layer is formed of, for example, a silicon oxide film. The sacrificial layer can be removed by a wet etching process using, for example, hydrofluoric acid, buffered hydrofluoric acid, or the like. With this configuration, the first layer 25A can be patterned more precisely in a patterning process described later.

The second layer 20A is made of, for example, silicon such as polysilicon or single-crystal silicon. Examples of a method of forming the second layer 20A include, for example, a method of forming a polysilicon layer by a deposition method such as a CVD method, and a method of forming a single-crystal silicon layer using a deposition method such as an epitaxial growth method. Thereafter, planarization is performed as necessary by etch-back, CMP, or the like. The thickness of the second layer 20A is not particularly limited, and is, for example, 20 µm or more and 60 µm or less.

Figure 5:
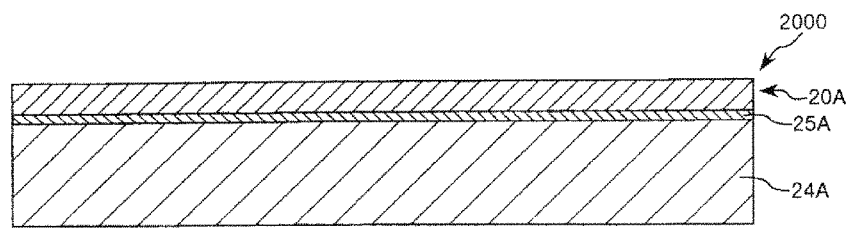
FIG. 5 is a cross-sectional view for explaining the method of manufacturing the optical scanner shown in FIG. 2.

Thus, a multilayer substrate 2000 shown in FIG. 5 is obtained. The multilayer substrate 2000 may be produced by a manufacturing method different from that described above, and may be, for example, a silicon-on-insulator (SOI) substrate or the like.

Any coating such as a silicon oxide film may be formed as necessary on the upper surface of the second layer 20A. The coating is formed by, for example, a thermal oxidation method (including a LOCOS method and an STI method), a sputtering method, a CVD method, or the like.

In advance of the formation of the coating, a piezoresistive element can be formed by ion implanting an impurity such as phosphorus or boron into the surface of the second layer 20A. A method of forming the piezoresistive element is not limited to this.

Figure 6:
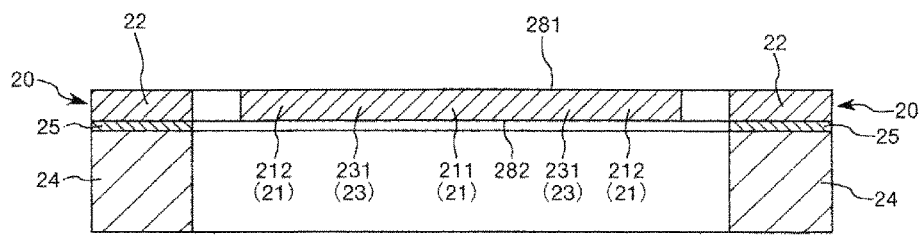
FIG. 6 is a cross-sectional view for explaining the method of manufacturing the optical scanner shown in FIG. 2.

Next, a mask (not shown) is formed on the lower surface of the substrate 24A and the upper surface of the second layer 20A, and thereafter, the substrate 24A, the first layer 25A, and the second layer 20A are processed by an etching process. With this configuration, the base portion 24, the connection layer 25, and the functional portion 20 shown in FIG. 6 are obtained. As the etching process, a dry etching process, for example, is used.

The multilayer substrate after being processed as shown in FIG. 6 may be produced by a manufacturing method different from that described above, and may be produced such that, for example, substrates each subjected to targeted patterning are bonded together.

[A-2] Wiring Line and Structure Forming Step

Figure 7:
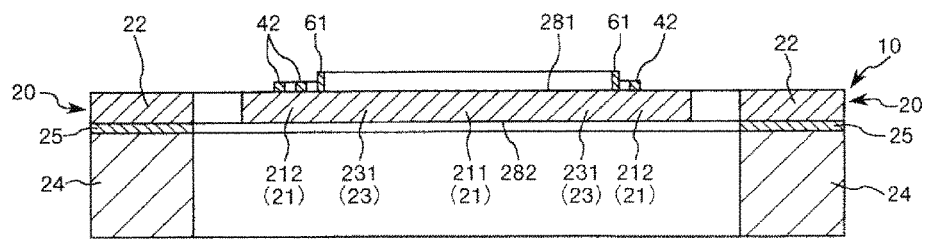
FIG. 7 is a cross-sectional view for explaining the method of manufacturing the optical scanner shown in FIG. 2.

Next, the wiring line 42 is formed on the first major surface 281 of the functional portion 20 (see FIG. 7). At the same time, the electrode pads 43 shown in FIG. 1 are formed on the support portion 22.

Each of the wiring line 42 and the electrode pad 43 is made of a simple substance of metal such as aluminum, nickel, gold, copper, or titanium, or an alloy thereof. A method of forming the wiring line 42 and the electrode pad 43 is not particularly limited, and examples of the method include various kinds of deposition methods such as a sputtering method, an evaporation method, and a CVD method, and various kinds of plating methods such as an electroless plating method and an electrolytic plating method. In these methods, the plating methods are preferably used, and the electroless plating method is more preferably used. According to the plating methods, the wiring line 42 or the electrode pad 43 having a targeted shape can be efficiently formed by previously securing an area where a plating material is to be deposited on the first major surface 281.

The wiring line 42 and the electrode pad 43 may be of a single layer or a plurality of layers. Examples of the plurality of layers include a two-layered structure in which, for example, a nickel-containing layer is formed on the first major surface 281 side and a gold-containing layer is formed on the nickel-containing layer. According to the configuration, compatibility between high rigidity resulting from nickel and high electrical conductivity and oxidation resistance resulting from gold can be achieved. Therefore, even if the mask 5 comes in contact with the wiring line 42, a break in the wiring line 42 or an increase in the electrical resistance thereof is unlikely to occur, and thus the reliability of the optical scanner 1 can be further enhanced.

In this step, the structure 61 is formed simultaneously with the formation of the wiring line 42 (see FIG. 7).

The structure 61 may be formed by any method, and examples thereof include, for example, deposition by various kinds of deposition methods, plating by various kinds of plating methods, bonding through an agent such as adhesive, and a method in which a material is supplied and then the material is hardened or cured.

In these methods, the structure 61 is preferably formed by the same method as the wiring line 42. With this configuration, since the wiring line 42 and the structure 61 can be formed simultaneously, the manufacturing efficiency of the optical scanner 1 can be further enhanced.

In that case, the wiring line 42 and the structure are preferably formed particularly by the electroless plating method. By the use of the electroless plating method as described above, a plating coating having a targeted shape can be formed by autodeposition by securing the area where the plating material is to be deposited (hereinafter also abbreviated as "autodeposition area"). In that case, the thickness of the plating coating to be deposited can be varied depending on the autodeposition area secured per unit area on the first major surface 281. Hence, for example, by setting the width of an autodeposition area for forming the structure 61 to be narrower than the width of an autodeposition area for forming the wiring line 42, the thickness of the plating coating constituting the structure 61 can be made thicker than the thickness of the plating coating constituting the wiring line 42 even when subjected to an electroless plating method for the same time. With this configuration, the wiring line 42 and the structure 61 having different thickness can be simultaneously formed even when subjected only once to the electroless plating method, which contributes to enhanced manufacturing efficiency of the optical scanner 1.

Thus, the member 10 for an optical scanner is obtained.

[B] Mask Disposing Step B

Figure 8:
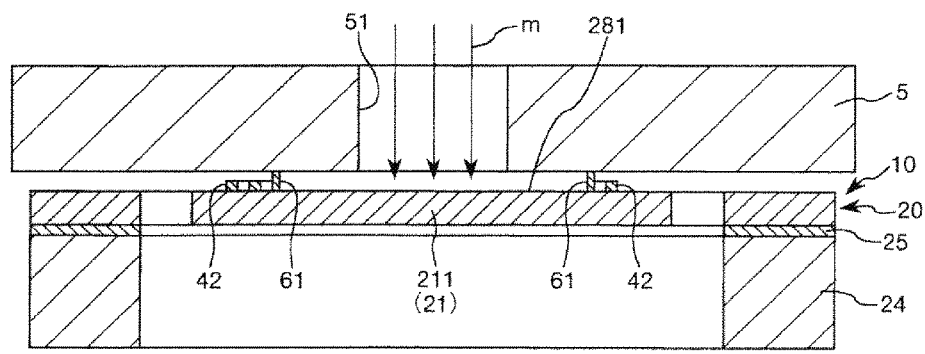
FIG. 8 is a cross-sectional view for explaining the method of manufacturing the optical scanner shown in FIG. 2.

Next, as shown in FIG. 8, the mask 5 is disposed in a position in contact with the structure 61 of the member 10 for an optical scanner. Then, the mask 5 is set such that an opening 51 of the mask 5 and the first movable portion 211 overlap each other in the plan view.

By disposing the mask 5 such that the structure 61 and the mask 5 are in contact with each other, it becomes impossible to move the mask 5 still closer to the first major surface 281 side, and thus the contact between the mask 5 and the wiring line 42 can be prevented. Moreover, even if the mask 5 sags, for example, and comes in contact with the wiring line 42, the application of a large load to the wiring line 42 can be prevented. As a result, an adverse effect on the wiring line 42 due to the contact or the application of a large load can be prevented, and thus the occurrence of troubles, such as a break in the wiring line 42 or an increase in the electrical resistance thereof, can be prevented.

In other words, it is possible, without paying a lot of attention to the contact between the wiring line 42 and the mask 5, to easily bring about the state where the mask 5 and the first major surface 281 are in extremely close contact with each other. Therefore, a spaced apart distance between the mask 5 and the first major surface 281 can be reduced, and thus the deposition area defined by the mask 5 can be controlled more precisely.

[C] Light Reflective Portion Forming Step C

Figure 9:
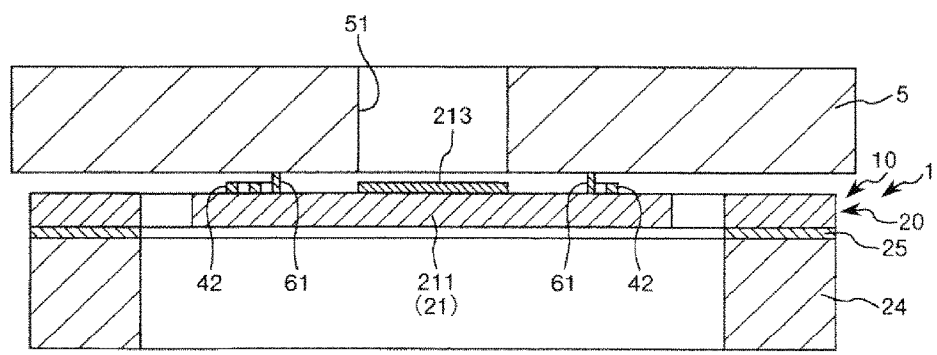
FIG. 9 is a cross-sectional view for explaining the method of manufacturing the optical scanner shown in FIG. 2.

Next, the deposition material m is supplied through the mask 5 by various kinds of deposition methods (see FIG. 8). With this configuration, the deposition material m is deposited on the first major surface 281 of the first movable portion 211 to form the light reflective portion 213 as shown in FIG. 9. Thus, the optical scanner 1 is obtained.

By forming the light reflective portion 213 after forming the wiring line 42 as described above, a reduction in reflectance due to a wiring line material adhering to the light reflective portion 213 can be avoided compared with the case where the light reflective portion 213 and the wiring line 42 are formed in reverse order.

Examples of the deposition material m include, for example, metal such as aluminum. Examples of the deposition method include, for example, a sputtering method, an evaporation method, and a CVD method.

In the embodiment, the structure 61 is disposed on the first movable portion 211 side of the wiring line 42, that is, on the inside of the wiring line 42. Therefore, when the mask 5 is disposed so as to come in contact with the structure 61, the structure 61 functions as a shield that holds back the flowing out of the deposition material m supplied through the opening 51 to the wiring line 42 side. Hence, the deposition material m supplied through the opening 51 to the first movable portion 211 is deposited on the first major surface 281 to form the light reflective portion 213, and is also held back inside by the structure 61. As a result, the adhesion of the deposition material m to the wiring line 42 can be prevented, and the occurrence of failures, such as a short circuit, in the wiring line 42 can be prevented. With this configuration, the optical scanner 1 with high reliability is obtained.

From the viewpoint of the shield that holds back the deposition material m, the ring shape of the structure 61 shown in FIG. 1 is also useful. That is, since the structure 61 having a ring shape can substantially eliminate the possibility of flowing out of the deposition material m, the probability of occurrence of failures in the wiring line 42 can be particularly reduced.

The plan-view shape of the structure 61 is not limited to that shown in the drawing, and may be any shape. For example, the structure 61 shown in FIG. 1 may be partially discontinuous in the middle, or may have a multiple-ring shape. Moreover, another structure may be provided in addition to the structure 61 shown in FIG. 1. In that case, another structure may be provided on the second movable portion 212 or the support portion 22.

Since the structure 61 is provided on the first major surface 281 of the second movable portion 212, the distance between the structure 61 and the wiring line 42 can be reduced. Therefore, even if the mask 5 sags for example, the probability of contact between the mask 5 and the wiring line 42 can be reduced.

The thickness of the structure 61 is not particularly limited as long as the thickness is thicker than the thickness of the wiring line 42. The thickness of the structure 61 is preferably approximately 101% or more and 5000% or less of the thickness of the wiring line 42, more preferably 110% or more and 3000% or less thereof, and further preferably 150% or more and 1000% or less thereof. When the thickness of the structure 61 falls within the range, it is possible to avoid an adverse effect of the structure 61 on the oscillation of the movable portion 21, or interruption of travel of light to be reflected or having been reflected by the light reflective portion 213, while sufficiently preventing the mask 5 from coming in contact with the wiring line 42. When the thickness of the structure 61 falls below the lower limit, there is little difference in thickness between the wiring line 42 and the structure 61; therefore, a sufficient advantageous effect may not be obtained depending on the shape or the like of the mask 5. On the other hand, when the thickness of the structure 61 exceeds the upper limit, the oscillation of the movable portion 21 may become unstable due to the influence of the structure 61 itself, or light to be radiated to the light reflective portion 213 or light having been reflected by the light reflective portion 213 may impinge on the structure 61, depending on the arrangement of the structure 61.

The constituent material of the structure 61 is not particularly limited, but is preferably a metal material or a resin material and more preferably a metal material. In the embodiment, when the metal material is used, the structure 61 can be formed simultaneously with the wiring line 42 in the manner as described above, which is useful from the viewpoint of manufacturing efficiency of the member 10 for an optical scanner. Moreover, when the metal material is used, the structure 61 with high rigidity can be formed, and thus the structure 61 that is less likely to be broken even when coming in contact with the mask 5 is obtained.

The metal material is not particularly limited. Examples thereof include metal such as aluminum, nickel, gold, copper, or titanium, and a simple substance or alloy thereof is used.

The structure 61 may be of a single layer or a plurality of layers. When the structure 61 is of a plurality of layers, the structure 61 of high functionality as a whole can be obtained by assigning specific functions to the layers. Examples of the plurality of layers include a two-layered structure in which, for example, a nickel-containing layer is formed on the first major surface 281 side and a gold-containing layer is formed on the nickel-containing layer. According to the configuration, compatibility between high rigidity resulting from nickel and high electrical conductivity and oxidation resistance resulting from gold can be achieved. Therefore, even if the mask 5 comes in contact with the structure 61, the collapse or falling down of the structure 61 is inhibited, and thus advantageous effects provided by the structure 61 can be maintained over the long term.

First Modified Example of Member for Optical Scanner

The structure preventing the contact between the mask and the wiring line may be provided in a position different from that of FIG. 1.

Figure 10:
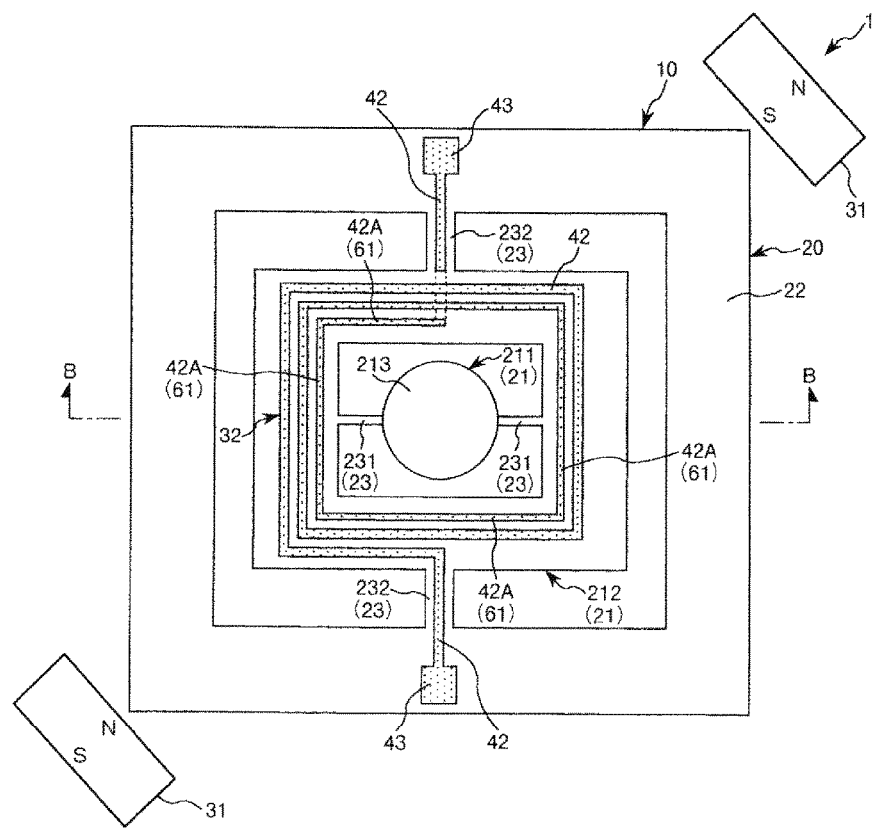
FIG. 10 is a plan view showing a first modified example of the optical scanner and the member for an optical scanner shown in FIG. 1.
Figure 11:
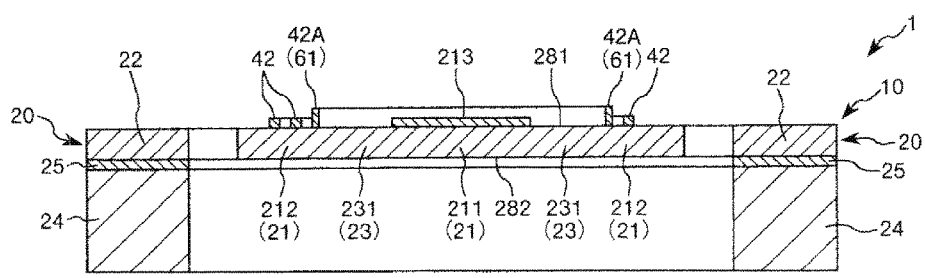
FIG. 11 is a cross-sectional view taken along the line B-B in FIG. 10.

FIG. 10 is a plan view showing a first modified example of the optical scanner 1 and the member 10 for an optical scanner shown in FIG. 1. FIG. 11 is a cross-sectional view taken along the line B-B in FIG. 10. In the following description, differences from the optical scanner 1 and the member 10 for an optical scanner shown in FIGS. 1 and 2 are mainly described, and a description of similar configurations is omitted. Moreover, in FIGS. 10 and 11, the configurations similar to those of FIGS. 1 and 2 are denoted by the same reference numerals and signs.

The member 10 for an optical scanner shown in FIG. 10 includes, when the wiring line 42 is defined as a first wiring line, a second wiring line 42A that is different from the wiring line 42. In the member 10 for an optical scanner shown in FIG. 10, the second wiring line 42A corresponds to the structure 61 shown in FIGS. 1 and 2.

Since the second wiring line 42A corresponds to the structure 61, the second wiring line 42A has both the function of a conducting path and the function of the structure 61. Therefore, there is no need to provide a structure that has only the function of the structure 61, and the space on the first major surface 281 of the second movable portion 212 can be effectively used. With this configuration, the optical scanner 1 can be miniaturized or the number of turns of the coil 32 can be increased, so that the higher functionality of the optical scanner 1 is achieved.

The second wiring line 42A may not be electrically connected with the wiring line 42; however, the wiring line 42 and the second wiring line 42A are electrically connected together in the modified example. Therefore, the wiring line 42 and the second wiring line 42A function as a continuous wiring line and form the coil 32. Specifically, the wiring line including the wiring line 42 and the second wiring line 42A makes two and a half turns along the circumferential direction of the second movable portion 212. With this configuration, the second wiring line 42A can be formed simultaneously with the wiring line 42 (first wiring line), which contributes to further enhanced manufacturing efficiency of the member 10 for an optical scanner.

The position of connecting the wiring line 42 with the second wiring line 42A is not limited to the position shown in the drawing. For example, in the wiring lines shown in FIG. 10, the inner upper right wiring line may be the second wiring line 42A as shown in FIG. 10, or may be the wiring line 42.

The second wiring line 42A is configured so as to be thicker than the wiring line 42. The member 10 for an optical scanner including the second wiring line 42A can prevent the contact between the mask and the wiring line 42 in forming the light reflective portion 213 on the first major surface 281 of the first movable portion 211 by various kinds of deposition methods, similarly to the embodiment. As a result, the occurrence of troubles, such as a break in the wiring line 42 or an increase in the electrical resistance thereof, can be prevented.

On the other hand, the second wiring line 42A is thicker than the wiring line 42, and therefore, an adverse effect, such as a break or an increase in electrical resistance, can be minimized even if the second wiring line 42A comes in contact with the mask.

Moreover, the second wiring line 42A is disposed on the inside of the wiring line 42 similarly to the structure 61 shown in FIGS. 1 and 2. Therefore, the adhesion of a deposition material to the wiring line 42 can be prevented. Further, the second wiring line 42A has a ring shape in a plan view similarly to the structure 61 shown in FIG. 1. Also from such a viewpoint, the adhesion of the deposition material to the wiring line 42 can be inhibited.

On the other hand, since the second wiring line 42A functions as a shield that holds back the flowing out of the deposition material, the deposition material may adhere to the second wiring line 42A. However, since the second wiring line 42A is disposed inside the wiring line 42, there is no fear of the occurrence of a short circuit with another wiring line even when the deposition material adheres to the second wiring line 42A. Therefore, the arrangement described above makes it possible to avoid the occurrence of troubles.

In the modified example as described above, the second wiring line 42A serving as a portion of the coil 32 also has the function of the structure 61. Hence, there is no need to provide a separate structure from the coil 32, so that the space on the first major surface 281 of the second movable portion 212 can be effectively used. With this configuration, for example, the number of turns of the coil 32 can be increased, or the insulation between the wiring lines 42 or between the wiring line 42 and the second wiring line 42A can be increased by securing the distance therebetween.

Also in the first modified example described above, advantageous effect similar to those of the embodiment are provided.

Second Modified Example of Member for Optical Scanner

Figure 12:
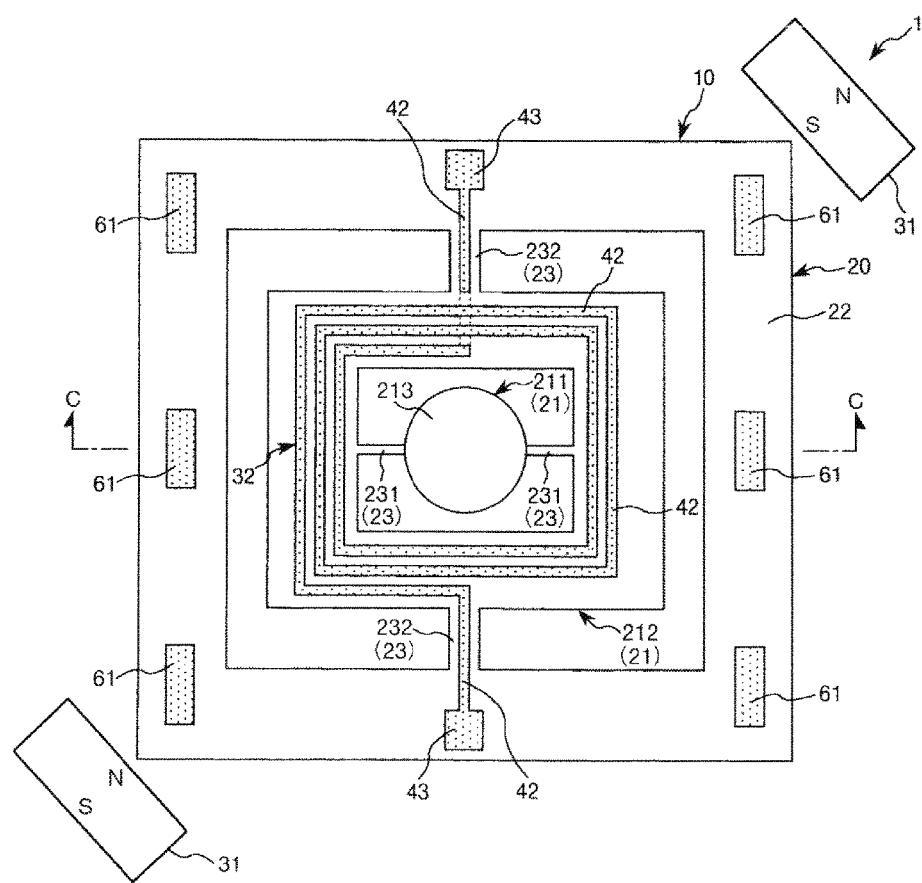
FIG. 12 is a plan view showing a second modified example of the optical scanner and the member for an optical scanner shown in FIG. 1.
Figure 13:
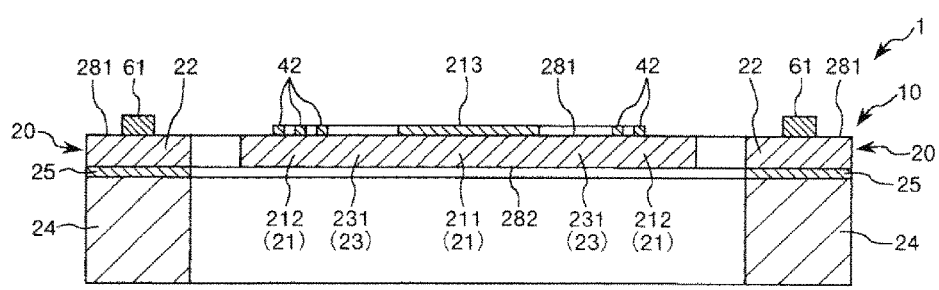
FIG. 13 is a cross-sectional view taken along the line C-C in FIG. 12.

FIG. 12 is a plan view showing a second modified example of the optical scanner 1 and the member 10 for an optical scanner shown in FIG. 1. FIG. 13 is a cross-sectional view taken along the line C-C in FIG. 12. In the following description, differences from the optical scanner 1 and the member 10 for an optical scanner shown in FIGS. 1 and 2 are mainly described, and a description of similar configurations is omitted. Moreover, in FIGS. 12 and 13, the configurations similar to those of FIGS. 1 and 2 are denoted by the same reference numerals and signs.

The member 10 for an optical scanner shown in FIG. 13 includes six structures 61 provided on the first major surface 281 of the support portion 22. The member 10 for an optical scanner including the structures 61 can prevent the contact between the mask and the wiring line 42 in forming the light reflective portion 213 on the first major surface 281 of the first movable portion 211 by various kinds of deposition methods, similarly to the embodiment. As a result, the occurrence of troubles, such as a break in the wiring line 42 or an increase in the electrical resistance thereof, can be prevented.

Moreover, since the structure 61 is provided on the support portion 22, a number of structures 61 or a larger structure 61 can be provided. Therefore, it is possible to increase the number of contact points between the mask and the structure 61, or widen the contact area. With this configuration, the mask can be held more stably, and the light reflective portion 213 can be deposited with higher precision.

Further, since there is no need to provide the structure 61 on the second movable portion 212, the space on the first major surface 281 of the second movable portion 212 can be effectively used for another purpose. With this configuration, for example, the number of turns of the coil 32 can be increased, or the insulation between the wiring lines 42 can be increased by securing the distance therebetween.

The constituent material of the structure 61 is not particularly limited, but is preferably a metal material or a resin material. In the modified example, when the resin material is used, the structure 61 can be relatively easily formed, and thus a cost reduction is achieved. Moreover, the resin material can impart flexibility to the structure 61. With this configuration, the structure 61 has a buffer function, so that an impact caused when, for example, the mask and the structure 61 come in contact with each other can be made less likely to propagate to the second movable portion 212. As a result, the breakage of the second movable portion 212 can be prevented. On the other hand, when the metal material is used, the structure 61 with high rigidity can be formed, and thus the structure 61 that is less likely to be broken even when coming in contact with the mask is obtained.

The resin material is not particularly limited, and examples thereof include, for example, a polyolefin-based resin, an acrylic-based resin, an epoxy-based resin, a polyimide-based resin, and a polyamide-based resin.

The structures 61 may be disposed at any positions on the support portion 22. Preferably, however, when the oscillation axis J1 (see FIG. 1) or the oscillation axis J2 (see FIG. 1) is defined as the axis of symmetry as shown in FIG. 12, the structures 61 are provided at positions satisfying a line symmetrical relationship. With this configuration, since the mask can be stably held when the mask is disposed so as to come in contact with the structure 61, the light reflective portion 213 can be deposited with high precision.

The number of the structures 61 is not particularly limited, but is preferably two or more and 200 or less and more preferably three or more and 100 or less.

Also in the second modified example described above, advantageous effect similar to those of the embodiment are provided.

3. Image Display Device

An image display device according to the invention includes an optical scanner according to the invention.

Figure 14:
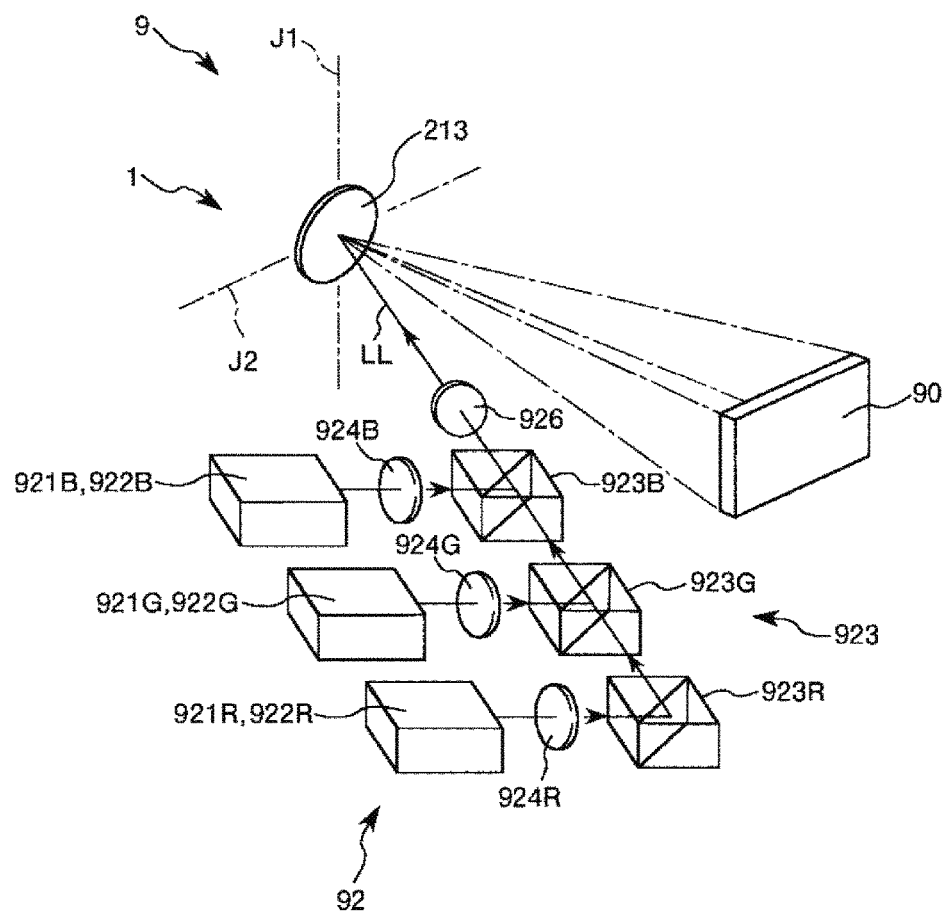
FIG. 14 is a diagram schematically showing an embodiment of an image display device.

FIG. 14 is a diagram schematically showing an embodiment of the image display device.

An image display device 9 shown in FIG. 14 is a device that displays an image by performing two-dimensional scanning with laser LL for image drawing on an object 90 such as a screen or a wall surface.

The image display device 9 (image display device according to the embodiment) includes a light source unit 92 that emits the laser LL for image drawing, and the optical scanner 1 (optical scanner according to the embodiment) performing two-dimensional scanning with the laser LL emitted from the light source unit 92.

As shown in FIG. 14, the light source unit 92 includes a light source section including red, green, and blue laser light sources 921R, 921G, and 921B, drive circuits 922R, 922G, and 922B that drive the laser light sources 921R, 921G, and 921B, collimator lenses 924R, 924G, and 924B that collimate laser lights emitted from the laser light sources 921R, 921G, and 921B, a light combining section 923, and a condensing lens 926.

The laser light source 921R emits red light, the laser light source 921G emits green light, and the laser light source 921B emits blue light. With the use of the three colored lights, a full-color image can be displayed. The laser light sources 921R, 921G, and 921B are not particularly limited, and examples thereof include, for example, a laser diode and an LED.

The drive circuit 922R drives the laser light source 921R, the drive circuit 922G drives the laser light source 921G, and the drive circuit 922B drives the laser light source 921B. The drive circuits 922R, 922G, and 922B are controlled independently of each other by a control unit (not shown). The three laser lights emitted from the laser light sources 921R, 921G, and 921B driven by the drive circuits 922R, 922G, and 922B are collimated respectively by the collimator lenses 924R, 924G, and 924B, and then incident on the light combining section 923.

The light combining section 923 combines the lights from the laser light sources 921R, 921G, and 921B. The light combining section 923 includes three dichroic mirrors 923R, 923G, and 923B. The dichroic mirror 923R has the function of reflecting red light, the dichroic mirror 923G has the function of transmitting red light and reflecting green light, and the dichroic mirror 923B has the function of transmitting red light and green light and reflecting blue light.

With the use of the dichroic mirrors 923R, 923G, and 923B, the three colored laser lights, red light, green light, and blue light, from the laser light sources 921R, 921G, and 921B can be combined. Then, the control unit independently modulates the intensities of the lights from the laser light sources 921R, 921G, and 921B, so that the laser LL (light) for image drawing of a predetermined color is generated. The laser LL thus generated is converted to a desired numerical aperture (NA) through the condensing lens 926, and then guided to the optical scanner 1.

Although the light source unit 92 has been described above, the configuration of the light source unit 92 is not limited to the configuration of the embodiment as long as the light source unit 92 can generate the laser LL.

Moreover, since the optical scanner 1 can prevent a break in the wiring line or an increase in the electrical resistance thereof, the image display device 9 with high reliability is obtained.

Hereinafter, application examples of the image display device will be described.

Application Example 1 of Image Display Device

Figure 15:
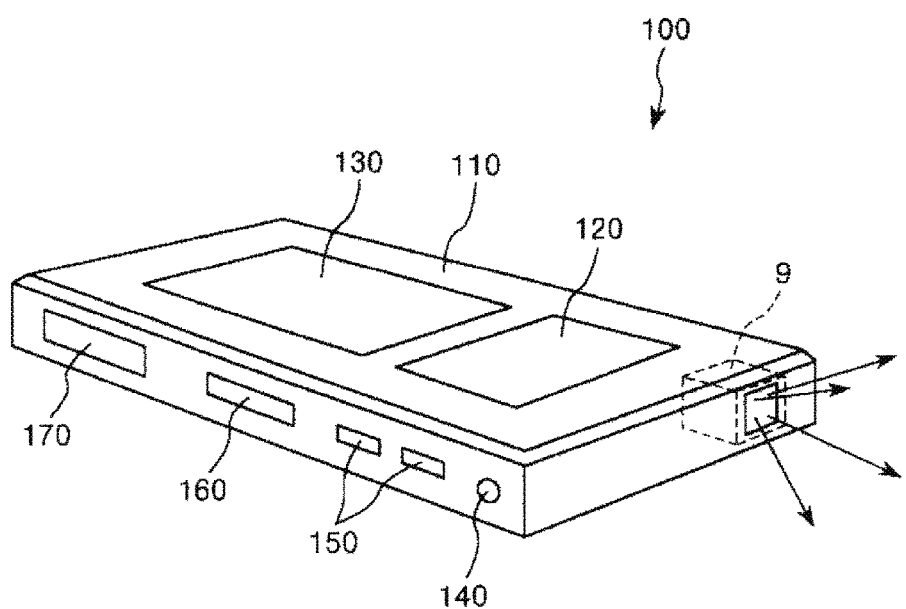
FIG. 15 is a perspective view showing Application Example 1 of the image display device.

FIG. 15 is a perspective view showing Application Example 1 of the image display device.

As shown in FIG. 15, the image display device 9 can be applied to a portable image display device 100.

The portable image display device 100 includes a casing 110 formed with dimensions allowing a user to hold the casing with hand, and the image display device 9 incorporated in the casing 110. The portable image display device 100 can display a predetermined image on a predetermined surface of, for example, a screen, a desk, or the like.

The portable image display device 100 includes a display 120 that displays predetermined information, a keypad 130, an audio port 140, control buttons 150, a card slot 160, and an AV port 170.

The portable image display device 100 may have other functions such as a communication function and a GPS reception function.

Application Example 2 of Image Display Device

Figure 16:
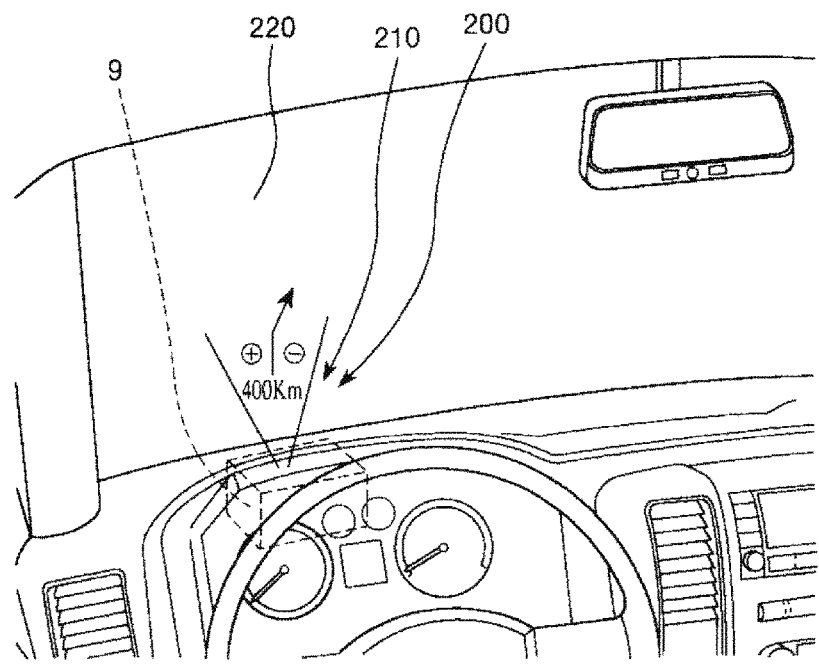
FIG. 16 is a perspective view showing Application Example 2 of the image display device.

FIG. 16 is a perspective view showing Application Example 2 of the image display device.

As shown in FIG. 16, the image display device 9 can be applied to a head-up display system 200.

In the head-up display system 200, the image display device 9 is mounted in a dashboard of an automobile so as to constitute a head-up display 210. The head-up display 210 can display a predetermined image, such as a guide display to a destination, on a windshield 220.

The application of the head-up display system 200 is not limited to the automobile, and the head-up display system 200 can be applied to, for example, aircraft, ships, and the like.

Application Example 3 of Image Display Device

Figure 17:
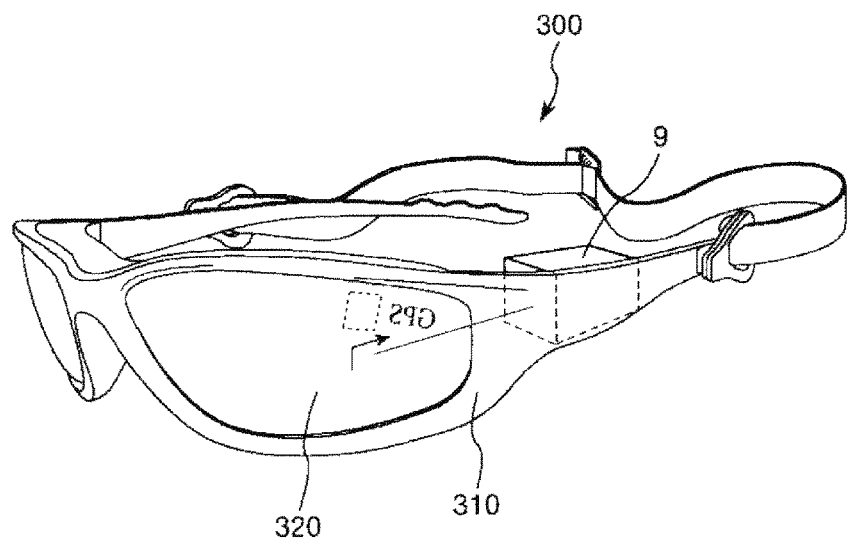
FIG. 17 is a perspective view showing Application Example 3 of the image display device.

FIG. 17 is a perspective view showing Application Example 3 of the image display device.

As shown in FIG. 17, the image display device 9 can be applied to a head-mounted display 300. That is, a head-mounted display according to the invention includes the image display device according to the invention.

The head-mounted display 300 shown in FIG. 17 includes eyeglasses 310 and the image display device 9 mounted on the eyeglasses 310. That is, the head-mounted display 300 includes the optical scanner 1 described above. The image display device 9 displays a predetermined image that is visually recognized by one eye on a display section 320 provided in a portion of the eyeglasses 310, which is originally a lens.

The display section 320 may be transparent or opaque. When the display section 320 is transparent, information from the image display device 9 can be used in addition to information from the real world.

The head-mounted display 300 may be provided with two image display devices 9, and images that are visually recognized by both eyes may be displayed on two display sections.

Moreover, since the optical scanner 1 included in the image display device 9 can prevent a break in the wiring line or an increase in the electrical resistance thereof, the head-mounted display 300 with high reliability is obtained.

The member for an optical scanner, the optical scanner, the method of manufacturing an optical scanner, the image display device, and the head-mounted display according to the invention have been described based on the embodiments shown in the drawings, but the member for an optical scanner, the optical scanner, the method of manufacturing an optical scanner, the image display device, and the head-mounted display are not limited to these embodiments.

For example, in the member for an optical scanner, the optical scanner, the image display device, and the head-mounted display, the configuration of each portion can be replaced with any configuration having a similar function, and any other configurations can be added.

In the method of manufacturing an optical scanner, a step for any purpose may be added to the embodiment.

In the embodiment described above, the description has been made of an example in which a moving coil method is employed as a drive method of the optical scanner. However, the invention is not limited to this and can be applied to an optical scanner employing a moving magnet method. Moreover, the invention is not limited to the electromagnetic drive method, such as the moving magnet method or the moving coil method, and can be applied to, for example, other drive methods, such as a piezoelectric drive method and an electrostatic drive method.

In the embodiment described above, the movable portion includes the first movable portion and the second movable portion, and is oscillatable about the two axes. However, the member for an optical scanner according to the invention is not limited to this. The movable portion may include only the first movable portion and be oscillatable about one axis. In this case, the wiring line may be provided on the first major surface of the first movable portion, and the structure may be provided at any portion on the first major surface of the functional portion.

The entire disclosure of Japanese Patent Application No. 2016-067515, filed Mar. 30, 2016 is expressly incorporated by reference herein.

What is claimed is:

1. A member for an optical scanner, comprising:
a functional portion comprising a movable portion and a support portion supporting the movable portion;
a wiring line provided on the movable portion; and
a structure provided on the movable portion, wherein
the structure is thicker than the wiring line,
the wiring line and the structure are provided on a first major surface of the movable portion, and
when the wiring line is defined as a first wiring line, the structure is a second wiring line different from the first wiring line.

2. The member for an optical scanner according to claim 1, wherein the wiring line is a coil.

3. An optical scanner comprising:
the member for an optical scanner according to claim 2; and
a light reflective portion provided on the first major surface of the movable portion.

4. The member for an optical scanner according to claim 1, wherein a constituent material of the structure is a metal material or a resin material.

5. The member for an optical scanner according to claim 1, wherein
the first wiring line and the second wiring line are electrically connected.

6. An optical scanner comprising:
the member for an optical scanner according to claim 1; and
a light reflective portion provided on the first major surface of the movable portion.

7. An image display device comprising the optical scanner according to claim 6.

8. A head-mounted display comprising the optical scanner according to claim 6.

9. A method of manufacturing an optical scanner, comprising:
disposing a mask in a position in contact with the structure of the member for an optical scanner according to claim 1; and
supplying a deposition material onto the first major surface of the movable portion through the mask to form a light reflective portion.

* * * * *